United States Patent Office 2,827,497
Patented Mar. 18, 1958

2,827,497

PURIFICATION OF SYNTHETIC MENTHOL BY OXIDIZING WITH HEXAVALENT CHROMIUM

Robert R. Bottoms, Crestwood, Ky., assignor to National Cylinder Gas Company, Chicago, Ill., a corporation of Delaware No Drawing. Application April 27, 1955
Serial No. 504,346

6 Claims. (Cl. 260—631)

This invention relates to the purification of synthetic menthol. More specifically, this invention relates to the removal of geometrical isomers of menthol from menthol by selective oxidation of said geometrical isomers of menthol.

The compound formed by the reduction of a menthol precursor, such as thymol, pulegone, or menthone, has the following graphic formula:

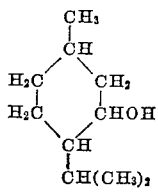

It contains three asymmetric carbon atoms and therefore can exist in four racemic modifications, known as dl-menthol, dl-isomenthol, dl-neomenthol, and dl-neoisomenthol. In the commercial production of synthetic racemic menthol by catalytic hydrogenation of such materials as menthone, pulegone, and thymol, the desired dl-menthol is always found to contain a definite amount of other geometrical isomers of menthol. Such isomers of menthol have little commercial value and must be removed from the synthetic racemic menthol before the latter can be used, sold commercially or resolved to produce synthetic l-menthol.

Methods of purifying synthetic racemic menthol to eliminate geometrical isomers of menthol have, in the past, been tedious and expensive. Generally, the purification has been accomplished by fractional distillation or fractional crystallization, but these methods of purification have never produced racemic menthol in sufficiently high state of purity to meet the rigid requirements for pharmaceutical use. As a more recent improvement in the purification method, it has been the practice to prepare esters of the purified synthetic racemic menthol and fractionally crystallize such esters to obtain pure esters of dl-menthol, the esters of the undesirable menthol isomers remaining in the solution. The esters of dl-menthol are subsequently hydrolyzed to yield pure menthol.

It is the object of this invention to provide a method for removing geometrical isomers of menthol from racemic menthol. It is a further object of this invention to provide a simple and economical method of removing geometrical isomers of menthol from racemic menthol by selective oxidation. These and other objects of this invention will be apparent from the following disclosure.

The present invention is based upon the discovery that geometrical isomers of menthol in admixture with racemic menthol may be effectively removed and the menthol left in a condition of high purity by a selective oxidation method whereby the geometrical isomers of menthol are oxidized to menthone. The menthone is easily removed from the menthol by virtue of its differences in chemical structure and attendant differences in physical properties.

The oxidation of geometrical isomers of menthol to menthone is carried out selectively and conveniently by oxidation with chromium trioxide (chromic anhydride) or other hexavalent chromium compound, such as sodium or potassium chromate or dichromate, in aqueous acid solution, preferred being aqueous solutions of the lower fatty acids such as acetic or propionic acid. The reaction is conducted at a temperature in the range of 40° to 100° C. over a period of one-half hour to several hours. Generally, slightly more than the theoretical amount of chromium trioxide is employed, although it is possible to carry out the reaction with the theoretical amount of chromium trioxide, based on the amount of isomers of menthol present. Large excesses of oxidizing agents are to be avoided because of the possibility of oxidizing some of the racemic menthol. Obviously, less than the theoretical amount of chromium trioxide will be inadequate to remove all of the geometrical isomers of menthol.

The following example is provided for the purpose of illustrating one embodiment of the invention, but is not to be construed as limiting the invention in scope. It will be apparent to those skilled in the art that a variety of modifications of conditions and relative amounts of materials, as well as oxidizing agents, may be made without departing from the invention. Amounts of materials are given in parts by weight and temperatures are recorded in degrees centigrade.

*Example*

1200 parts of racemic menthol partially purified by fractional distillation and fractional crystallization, and containing an estimated 230 parts of geometrical isomers of menthol, are dissolved in about one-half its volume of acetic acid and the resulting solution is warmed to about 55° C. The mixture is agitated and a solution containing 170 parts of chromium trioxide in 200 parts of 50% aqueous acetic acid is added slowly, the temperature being maintained at 55° to 60° C. by heating or cooling, as necessary, until the reaction is complete. After all of the chromium trioxide solution has been added, the reaction mixture is agitated for thirty minutes longer at about 55° C. It is then diluted with an equal volume of water and then cooled. The oily layer which separates is removed, dried and subjected to fractional distillation. After a first fraction of about 200 parts of menthone is recovered, a higher boiling fraction of racemic menthol is collected at 105–107° C. at 15 mm., amounting to about 900 parts, representing a yield of 93% of theory.

What is claimed as new and desired to be secured by Letters Patent of the United States is:

1. A method of purifying menthol admixed with geometrical isomers of menthol which comprises selectively oxidizing said geometrical isomers of menthol to menthone with a hexavalent chromium oxidizing agent in an acid medium, and separating the racemic menthol from the menthone.

2. A method of purifying menthol admixed with geometrical isomers of menthol which comprises selectively oxidizing said geometrical isomers of menthol to menthone with a hexavalent chromium oxidizing agent in an acid medium at a temperature in the range of 40° to 100° C., and separating the menthol from the menthone.

3. A method of purifying menthol admixed with geometrical isomers of menthol which comprises selectively oxidizing said geometrical isomers of menthol to menthone with a hexavalent chromium oxidizing agent in aqueous acid solution, and separating the menthol from the menthone.

4. A method of purifying menthol admixed with geometrical isomers of menthol which comprises selectively oxidizing said geometrical isomers of menthol to menthone with a hexavalent chromium oxidizing agent in aqueous acetic acid solution, and separating the menthol from the menthone.

5. A method of purifying racemic menthol contaminated with geometrical isomers of menthol, which comprises oxidizing a mixture of menthol and geometrical isomers of menthol in an aqueous solution of a lower fatty acid at a temperature in the range of 40° to 100° C. with an amount of chromium trioxide equivalent to the amount of geometrical isomers of menthol present, and separating the racemic menthol from the menthone produced by oxidation of the geometrical isomers of menthol.

6. The method of claim 5 wherein the amount of chromium trioxide present is a slight excess over the amount of geometrical isomers of menthol present.

References Cited in the file of this patent

Simonsen: The Terpenes, vol. 1 (2nd ed.), Cambridge, 1947; p. 246.